US007219069B2

(12) United States Patent
Fouquet (10) Patent No.: US 7,219,069 B2
(45) Date of Patent: May 15, 2007

(54) SYSTEM AND METHOD FOR CREATING DYNAMIC FACILITY MODELS WITH DATA NORMALIZATION AS ATTRIBUTES CHANGE OVER TIME

(75) Inventor: Christophe Fouquet, Alpharetta, GA (US)

(73) Assignee: Schlumberger Resource Management Services, Inc., Norcross, GA (US)

( * ) Notice: Subject to any disclaimer, the term of this patent is extended or adjusted under 35 U.S.C. 154(b) by 953 days.

(21) Appl. No.: 09/849,938

(22) Filed: May 4, 2001

(65) Prior Publication Data

US 2002/0165750 A1 Nov. 7, 2002

(51) Int. Cl.
*G05B 19/418* (2006.01)

(52) U.S. Cl. .................. 705/8; 703/1; 703/3; 703/6; 703/7

(58) Field of Classification Search .............. 705/8
See application file for complete search history.

(56) References Cited

U.S. PATENT DOCUMENTS

| | | | | |
|---|---|---|---|---|
| 5,500,795 | A | * | 3/1996 | Powers et al. ................ 705/11 |
| 5,566,084 | A | * | 10/1996 | Cmar ........................ 700/276 |
| 5,726,914 | A | * | 3/1998 | Janovski et al. .............. 702/84 |
| 5,758,331 | A | * | 5/1998 | Johnson ...................... 705/412 |
| 5,924,051 | A | * | 7/1999 | Provost et al. ................ 702/61 |
| 5,983,010 | A | * | 11/1999 | Murdock et al. .............. 703/6 |
| 6,088,688 | A | * | 7/2000 | Crooks et al. ............... 705/412 |
| 6,366,889 | B1 | * | 4/2002 | Zaloom ........................ 705/7 |
| 6,509,730 | B1 | * | 1/2003 | Afsah ....................... 324/158.1 |
| 6,701,298 | B1 | * | 3/2004 | Jutsen .......................... 705/7 |
| 6,738,744 | B2 | * | 5/2004 | Kirovski et al. ............. 704/273 |
| 6,754,673 | B2 | * | 6/2004 | Horn et al. ................ 707/104.1 |
| 6,877,034 | B1 | * | 4/2005 | Machin et al. ............. 709/223 |
| 6,996,508 | B1 | * | 2/2006 | Culp et al. ..................... 703/2 |
| 2001/0053940 | A1 | * | 12/2001 | Horn et al. .................... 700/32 |
| 2001/0053993 | A1 | * | 12/2001 | McLean et al. .............. 705/10 |
| 2002/0178035 | A1 | * | 11/2002 | Lajouanie .................... 705/7 |
| 2002/0194329 | A1 | * | 12/2002 | Alling ........................ 709/224 |
| 2003/0018513 | A1 | * | 1/2003 | Hoffman et al. ............. 705/10 |
| 2004/0015271 | A1 | * | 1/2004 | Juneau ........................ 700/286 |

OTHER PUBLICATIONS

Robert, Camp, Benchmarking the search for industry best practices that lead to superior performance Quality Press, 1989, ISBN: 0-87389-058-2.*

(Continued)

*Primary Examiner*—Tariq R. Hafiz
*Assistant Examiner*—Scott L. Jarrett
(74) *Attorney, Agent, or Firm*—Dority & Manning, P.A.

(57) ABSTRACT

Users desire to normalize raw data from meter load profile acquisition systems against some attributes (i.e., properties) of a facility, such as the number of employees. The facility area, and the number of products produced would be additional potential attributes for consideration. Normalization involves dividing a load profile channel such as kiloWatt hours by a determined facility attribute to obtain a new data set, for example, such as "kWh/Employee." The present modelization allows a user to define a set of attributes and manage their value over time to refine the facility model. Keeping track of the attributes over time provides increased accuracy in the resulting data. The model is managed by a user interface which can be refined over time as the facility evolves. Data comprising sets of attributes over time may persist within the system for later retrieval.

45 Claims, 6 Drawing Sheets

OTHER PUBLICATIONS

Ross, Phillip C., Energy Benchmarking for the Glass Industry American Ceramic Society, Oct. 1997, vol. 76, No. 10, pp. 85-89.*

Miakisz, Joseph A. et al., Environmental performance benchmarking for electric utilities Environmental Quality Management, Summer 1997, vol. 7, Issue 4, p. 49.*

Electric Generation Performance Benchmarking Subscription Service Announced by Metzler & Associates Sep. 11, 1998.*

Carver, Helen et al., Energy efficient ceramics production International Ceramics, Jan. 2001.*

RIS-Resolution.com Web Pages—Equipment Data Management Dec. 1999, Retrieved from Archive.org Jan. 12, 2006.*

RIS-Resolution.com Web Pages Apr. 2000, Retrieved from Archive.org Jan. 12, 2006.*

RIS-Resolution.com Web Pages—Products & Services Jun. 2000, Retrieved from Archive.org Jan. 12, 2006.*

RIS-Resolution.com Web Pages—Resolution Nov. 2000, Retrieved from Archive.org Jan. 12, 2006.*

SA-Inc.com Web Pages—Solomon Associates, Inc. Jan. 2001, Retrieved from Archive.org Jan. 12, 2006.*

Planergy Unveils Custom Energy Assessment Services for Semiconductor Manufacturers Business Wire, Mar. 9, 1998.*

Performance Monitoring and Evaluation Tips—Selecting Performance Indicators USAID, 1996, No. 6.*

MECON Announces New Web-Based Tools for Healthcare Cost Management and Planning PR Newswire, Jan. 4, 1999.*

Papamichael, K. et al., The Building Design Advisor ACADIA 1996 Conference, Oct./Nov. 1996.*

Papamichael K. et al., Building Design Advisor: Automated integration of multiple simulation tools Automation Construction, vol. 6, No. 4, Jul. 1997.*

Papamichael K. et al., Product modeling for computer-aided decision-making Automation in Construction, vol. 8, 1999.*

Papamichael, K., Application of information technologies in building design decisions Building Research & Information, vol. 27, No. 1, Jan./Feb. 1999.*

Bruce, D.M., Benchmarking Energy Consumption and Identifying Opportunities for Conservation Pul & Paper Canada, vol. 101, No. 11, Nov. 2000.*

* cited by examiner

SYSTEM AND METHOD FOR CREATING DYNAMIC FACILITY MODELS WITH DATA NORMALIZATION AS ATTRIBUTES CHANGE OVER TIME

BACKGROUND OF THE INVENTION

The present invention relates generally to improved method and apparatus for looking at energy use strategically. More specifically, the present invention relates to dynamic facility models that highlight opportunities to reduce resource consumption while allowing a facility manager to cost-effectively meet facility resource requirements, by facility modelization for facility benchmarking.

Facility managers often face a daunting task in their efforts to reduce costs associated with the consumption of electricity, gas and water (i.e., resources generally). Consider as an example the infrastructure of a typical major airport. The facility manager must cost-effectively provide the utility needs for an infrastructure consisting of main runways, aircraft taxiing and parking areas, main airport buildings, passenger transport systems, and buildings housing franchised companies spread over several miles of land. Similarly, the facility managers for public school systems, with monumental infrastructure needs, struggle to deliver the best educational environment for the fewest dollars. In certain more heavily competitive private markets, facility managers for giant retail stores, such as Wal-Mart, must cost-effectively supply the resource needs for stores located in diverse areas of the country.

Cost-effectively meeting the resource demands of diverse facilities is a complicated task. Different facilities, while having similar attributes, will often have different resource utilization patterns. In fact, the resource utilization patterns for a particular facility may vary over time due to changes in the facility attributes. Consequently, to accurately model a facility and to then accurately benchmark facility resource consumption, a dynamic modeling process is required (i.e., a process that not only considers facility attributes, but changes in facility attributes over time).

Conventional practices, while using the well-known concept of data normalization, does not typically have the ability to track changes in facility attributes over time. When a process does not have the ability to track changes in facility attributes, any such facility model will tend to be or to become inaccurate and any data generated using such a model would likewise be inaccurate.

For example, if one wishes to know the amount of electrical power a facility uses per employee, for the period of one year, one must determine the total power used and the number of people employed, at all times during the year in question in order to generate accurate data. Using conventional methodology, one could obtain the power utilization data from the power utility. However, unless the number of employees remained constant during the year in question, one would be forced to estimate the number of employees employed during the subject year. Finally, to obtain normalized data, such a conventional process would divide the power utilization data by the estimated number of employees. While such information might be useful to a limited extent, as noted, it would not be completely accurate.

Likewise, changing the number of personal computers, copiers, vending machines, employees or the number of offices (among many other potential changes) all can significantly affect the electrical load on a facility. Therefore, such conventional modeling methodology would generate inaccurate data if the attributes of interest were the number of computers, number of offices, or any other attribute that changed during the time period of interest.

SUMMARY OF THE INVENTION

The present invention recognizes and addresses various of the foregoing limitations and drawbacks, and others, of such conventional practices. In such context, the present invention recognizes that having complete information concerning resource consumption is desirable to a facility manager wishing to monitor and control/reduce such resource consumption.

Thus, broadly speaking, one principal object of the present invention is to provide improved method and apparatus for facility modelization. Another broad object is to provide such improved facility modelization in the context of improved facility benchmarking capabilities. In such context, a general object is to provide improved method and apparatus for looking at resource consumption strategically by creating dynamic facility models that highlight opportunities to reduce resource consumption while allowing facility managers to cost-effectively meet facility resource requirements.

Another general object of the present invention is to provide, for customers with multiple facilities, improved method and apparatus for comparing and benchmarking such respective facilities based on resource consumption.

Still another object of the present invention is to provide improved method and apparatus for comparing and benchmarking multiple facilities, owned by different customers, based on resource consumption.

Another present object is to present facility resource utilization data and benchmarking data in the form of historical and/or real-time reports that highlight opportunities to reduce resource consumption and maximize resource consumption efficiency.

Yet another object of the present invention is to provide to all customers a methodology and apparatus resulting in centralized access to all facility models and resource consumption data.

Additional objects and advantages of the present invention are set forth in, or will be apparent to those skilled in the art from, the detailed description herein. Also, it should be further appreciated that modifications and variations to the specifically illustrated, referenced, and discussed steps or features hereof may be practiced in various uses and embodiments of this invention without departing from the spirit and scope thereof, by virtue of present reference thereto. Such variations may include, but are not limited to, substitution of equivalent steps or features for those shown, referenced or discussed, and the functional, operational, or positional reversal of various features, steps, parts, or the like. Still further, it is to be understood that different embodiments, as well as different presently preferred embodiments, of this invention may include various combinations or configurations of presently disclosed steps, features or elements, or their equivalents (including combinations of steps, features or parts or configurations thereof not expressly shown in the figures or stated in the detailed description).

One exemplary such embodiment of the present invention relates to a method for modeling of facility performance. Such method may comprise the steps of assigning a predefined template to a facility to be modeled, obtaining resource utilization data for such facility, and normalizing such resource utilization data.

More preferably, a facility editor is used to assign predefined templates to a facility, which templates contain a list of facility attributes. The templates may include default facility attribute data. Likewise, the attributes are selected from an attribute catalog containing a list of user-defined and system-defined attributes. Importantly, as a facility changes over time, such facility templates and the attribute catalog may be updated to reflect such changes, thereby in such respect creating dynamic facility models.

The present invention is further functional in certain embodiments for determining the combined normalized resource utilization data for two or more facilities or groups of facilities. In certain such embodiments, the present invention may retrieve such facility resource utilization data and facility attribute data for two or more facilities and use an aggregation process or function to determine the total sum of such data. For example, assume that data for three facilities are retrieved, where the resource utilization data of interest is kWh, and the facility attribute data of interest is the number of employees. Such an exemplary aggregation process will return the total electricity consumption and the total number of employees for all three facilities. Next, the normalization process will generate normalized resource utilization data using such aggregate values.

Using such aggregation and normalization methodology, exemplary embodiments of the present invention have the ability to perform numerous comparisons based on facility resource utilization. Such comparisons include, but are not limited to, comparing normalized data for all facilities owned by an entity, all similar facilities owned by an entity, a user defined group of facilities owned by an entity, one facility compared to the aggregated data for a group of facilities, the aggregated data for facility group 1 compared to aggregated data for facility group 2, or for any combination of facilities, or group of facilities, regardless of ownership. In addition, such comparisons may be used to benchmark facilities based on normalized data.

In further exemplary embodiments of the present invention, upon generating either normalized data or benchmarking results, the present invention may generate historical and/or real-time reports presenting the facility modeling process or data derived therefrom in a user-defined format. Such data normalization, data aggregation, and report generation steps in exemplary embodiments may be activated by the occurrence of selected of the following events: user update of facility attribute data, user demanded report generation, or after a predefined period of time elapses. Such exemplary resource utilization data may represent such as energy, water, natural gas, or oil consumption. In certain preferred embodiments, the resource utilization data, the facility modeling process, and the reports (all types) would be maintained at a centralized location, such as on a utility provider's mainframe computer system, and made available to customers such as via the Internet or some other interconnected (either wired and/or wireless) electronic medium.

Another present exemplary embodiment of the present invention concerns a method for facility modeling and benchmarking. Such a method may include the steps of creating an attribute catalog, assigning attributes to a template, assigning selected of such templates to a facility, obtaining resource utilization data associated therewith, and normalizing such resource utilization data.

More preferably, the attributes catalog may comprise selected of user-defined and system-defended attributes. A template editor ideally assigns attributes to a new or pre-existing template selected of user-defined or system-defined templates. Similarly, a facility editor may assign templates (selected of user-defined or system-defined templates) to a facility. Furthermore, a benchmarking process may compare normalized resource utilization data for two or more facilities and may rank (i.e., benchmark) such facilities based on resource consumption.

Yet another exemplary embodiment of the present invention involves a method for creating dynamic facility models, in relation to resource utilization of such facilities, comparing resource utilization efficiency of such facilities, and generating reports in a user defined format that includes various combinations of the foregoing steps, further including the step of presenting such data in the form of historical and/or real-time reports. In certain such embodiments, the exemplary methodology may further include making such resource utilization data and reports available to a customer via the Internet or some other interconnected (wired and/or wireless) electronic medium.

In another exemplary embodiment, the present invention provides an improved apparatus for creating dynamic facility models in relation to resource utilization of such facilities. A facility editor is used to assign predefined templates to a facility. A data retrieval means is provided for obtaining resource utilization data for such facility while a data normalization means is provided for normalizing such resource utilization data, based on the predefined facility template. In certain of such preferred embodiments, the predefined template may include default facility attribute data.

Facility templates in certain embodiments may contain a list of facility attributes selected from a list of attributes contained in an attribute catalog. To make facility models dynamic, a means may be provided for creating new facility attributes, adding new facility attributes to an attributes catalog, and/or deleting facility attributes from the attributes catalog. Such data retrieval means may be further functional for obtaining resource utilization data as well as facility attribute data for two or more facilities.

In accordance with the present invention, a single facility may be benchmarked based on resource utilization without requiring a data aggregation process. When benchmarking two or more facilities based on resource utilization in accordance with exemplary embodiments of the present invention, aggregation of all resource utilization data and all facility attribute data, for the facilities being benchmarked, is utilized. Thus, the present invention provides in certain instances both normalization and aggregation means. Once aggregation, normalization, and/or benchmarking tasks are complete, a reporting means may be provided for generating historical and/or real-time reports. Finally, an electronic media means, such as the internet, or other interconnecting (wired and/or wireless) electronic media, may be preferably practiced to supply customer access to selected of: facility modeling means, resource utilization data retrieval means, normalization means, normalized data benchmarking means, and a historical and/or real-time reports means.

Additional embodiments of the subject invention, not necessarily expressed in this summarized section, may include and incorporate various combinations of aspects of features or parts referenced in the summarized objectives above, and/or other features or parts as otherwise discussed in this application. It should also be understood that the present invention equally pertains to apparatuses and devices corresponding with the exemplary methlolodgies referenced, and vice versa.

Those of ordinary skill in the art will better appreciate the features and aspects of such embodiments, and others, upon review of the remainder of the specification.

BRIEF DESCRIPTION OF THE DRAWINGS

A full and enabling disclosure of the present invention, including the best mode thereof, directed to one of the ordinary skill in the art, is set forth in the specification, which makes reference to the appended figures, in which.

Repeat use of reference characters throughout the present specification and appended drawings is intended to represent same or analogous features, elements or steps of the present invention.

DETAILED DESCRIPTION OF THE PREFERRED EMBODIMENTS

Reference now will be made in detail to embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment can be used on or with another embodiment to yield a still further embodiment. Thus, it is intended that the present invention cover such modifications and variations as come within the scope of the appended claims and their equivalents. Other objects, features, and aspects of the present invention are disclosed in or may be determined from the following detailed description, which is not intended as limiting the broader aspects of the present invention.

A principal object of the present invention is to provide a utility customer with a method for looking at energy use strategically by creating dynamic facility models. One full featured exemplary embodiment of the present invention may include (1) "Attribute Catalog", (2) "Template Editor", (3) "Facility Editor", (4) "Normalization Process", (5) "Aggregation Process" and (5) "Benchmarking Process." Reference will now be made in detail to the above components which in accordance with the subject invention may be practiced in various combinations, configurations and constructions as different embodiments of such invention. While the particulars of the present invention may be fully and readily adapted by those of ordinary skill in the art for use in modeling and benchmarking a facility using gas, water, oil, etc., the examples discussed herein simply are in the context of electrical power consumption.

Figure 1:
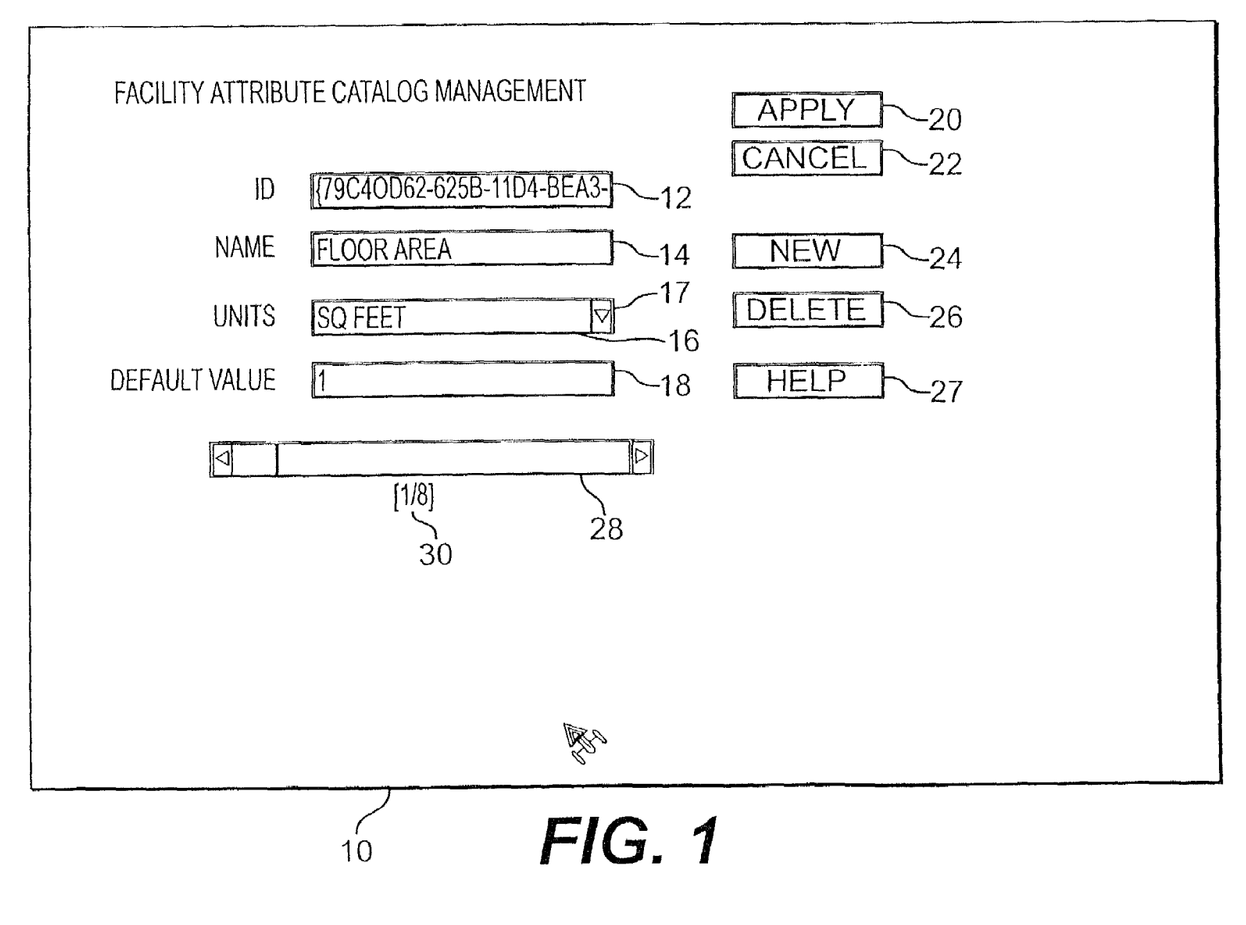
FIG. 1 depicts an exemplary display for a facility attribute catalog editor in accordance with a present exemplary embodiment.

An exemplary attribute catalog editor 10, shown in FIG. 1, allows a user such as a system administrator to manage a list of facility attributes. An exemplary facility catalog editor displays a Facility ID 12, an attribute Name 14 (such as "Floor Area"), an attribute Unit 16 (such as square feet), and an attribute default value 18. Facility attributes may be modified 20, added 24, or deleted 26 as desired, in accordance with the present invention. If the user decides to make no modifications, the operation may be canceled 22 and no changes will be made.

The attribute catalog also displays the number of attributes 30 associated with the subject facility ID. The user can scroll through the attribute list for a particular facility ID by using a slide-bar or arrow menu feature 28. If a user wishes to change the units for a particular attribute, the units may be typed directly into window 16 or selected from a list of units using dropdown arrow 17. The user presses the "Apply" button 20 to add the selected attribute to a list of attributes for the facility referenced by the facility ID shown in window 12 and the attributes counter 30 is automatically incremented.

"Button" as used herein includes virtually or computer-generated images of buttons or similar, onto which the user "clicks" or otherwise indicates actuation thereof. They may also be regarded as specialized function keys, provided in accordance with the subject invention.

While transparent to the user, the attribute catalog has two different types of attributes: (1) "System-Defined" attributes, and (2) "User Defined" attributes. For example, a large retailer (e.g., a Wal-Mart store) may have an attribute not listed among the "System-Defined" attributes. Therefore, a system administrator for such Wal-Mart store(s) could in accordance with the present invention create a "New" attribute 24 (FIG. 1) and add it to the Wal-Mart attribute catalog. Such new entry constitutes a "User-Defined" entry. In such example, only Wal-Mart stores would have access to such new "User-Defined" attribute whereas the "System-Defined" attributes are global to the entire system and can be accessed and utilized by all users.

Please note that the list of "System-Defined" attributes are preferably as extensive and complete as possible for a given context. When users model facilities using "System-Defined" attributes, the probability that different facilities will be modeled using identical facility attributes greatly increases. This, in turn, will maximize the benefits derived from using the benchmarking process (described in greater detail below). Consequently, a system level process, not accessible to a user, is operative for reclassifying a "User-Defined" attribute as a "System-Defined" attribute whenever a predetermined percentage of users have added such "User-Defined" attribute to the attributes catalog. Such predetermined percentage may be varied in accordance with the present invention.

Figure 2:
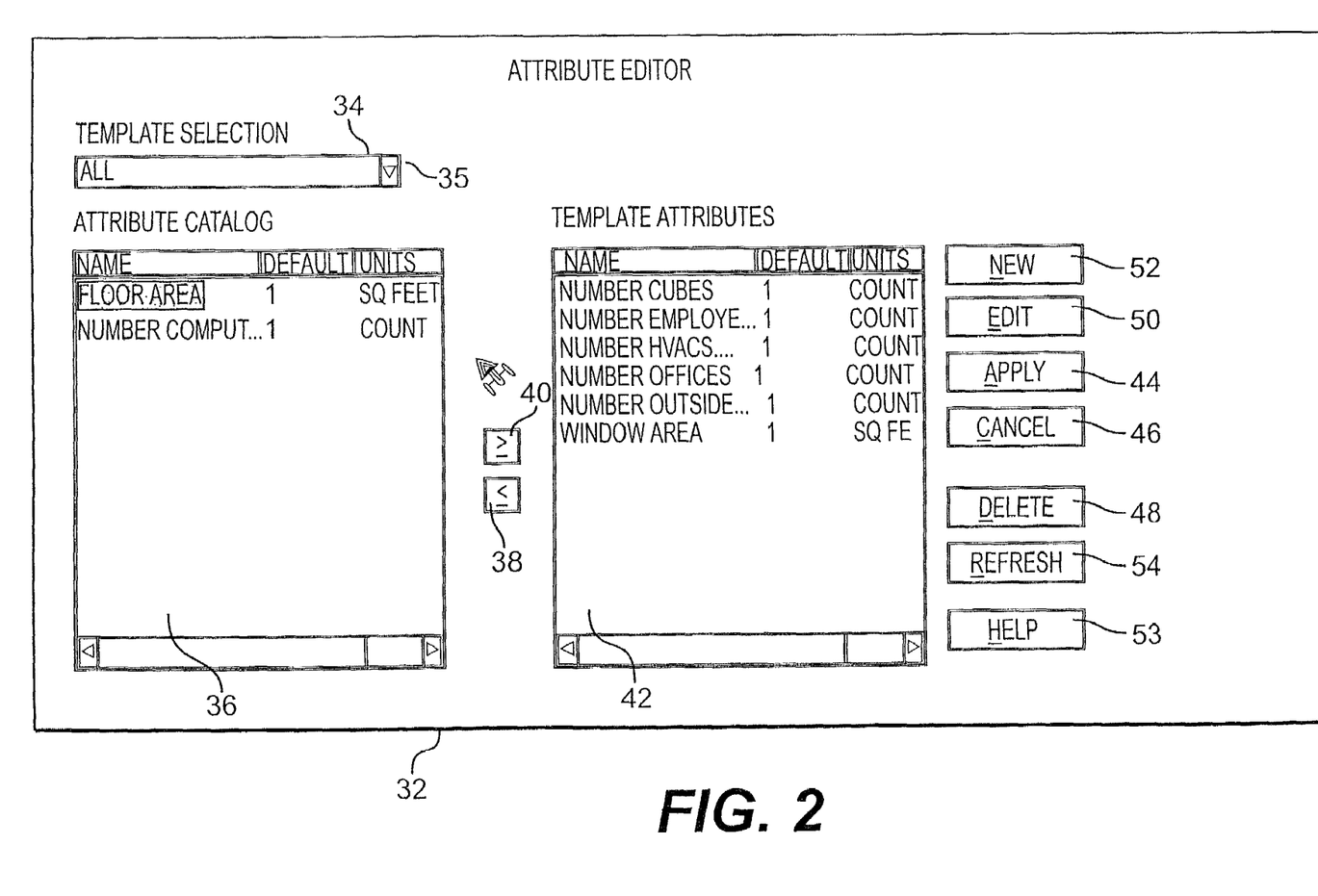
FIG. 2 depicts an exemplary display for a facility template editor screen in accordance with a present exemplary embodiment.

Once the user has defined all attributes necessary to model a particular facility, the user then, in accordance with certain preferred embodiments of the subject invention, preferably interacts with an exemplary facility template editor 32, shown in FIG. 2, to setup a new facility template or to edit an already existing facility template. For example, the user would create a new template by actuating "New" button 52 and giving such new template a name. Next the user selects, from the list of attributes displayed in an exemplary "window" 36, all the attributes that are to be assigned to such template. A separate window 42 may preferably list all attributes associated with the template identified by the name shown in a template selection window 34. The attribute catalog window 36 preferably lists all attributes that have not been assigned to the selected template. Attributes may be moved back and forth between attribute catalog window 36 and template window 42 using "buttons" or virtual function keys 38 and 40.

Should a user wish to edit or delete a template, such user in accordance with the subject invention would select the template of interest so that the template's name appears in the template selection window 34. Pressing down-arrow button 35 activates a drop-down menu to assist in selecting the desired template. Once such template has been selected, to edit the template, the user would actuate an edit button 50. After all changes are made, the user simply presses an "Apply" button 44 to confirm the changes or a "Cancel" button 46 to abandon the changes and return the original values. To delete the template, the user actuates the "Delete" button 48.

Please note that while facility attribute values may remain constant for a period of time (or an instant in time), facility attribute values have been found to rarely be constant for all time. Consequently, certain facility attribute values will change over time and such changes must be accounted for in the modeling process to yield accurate data.

Figure 3:
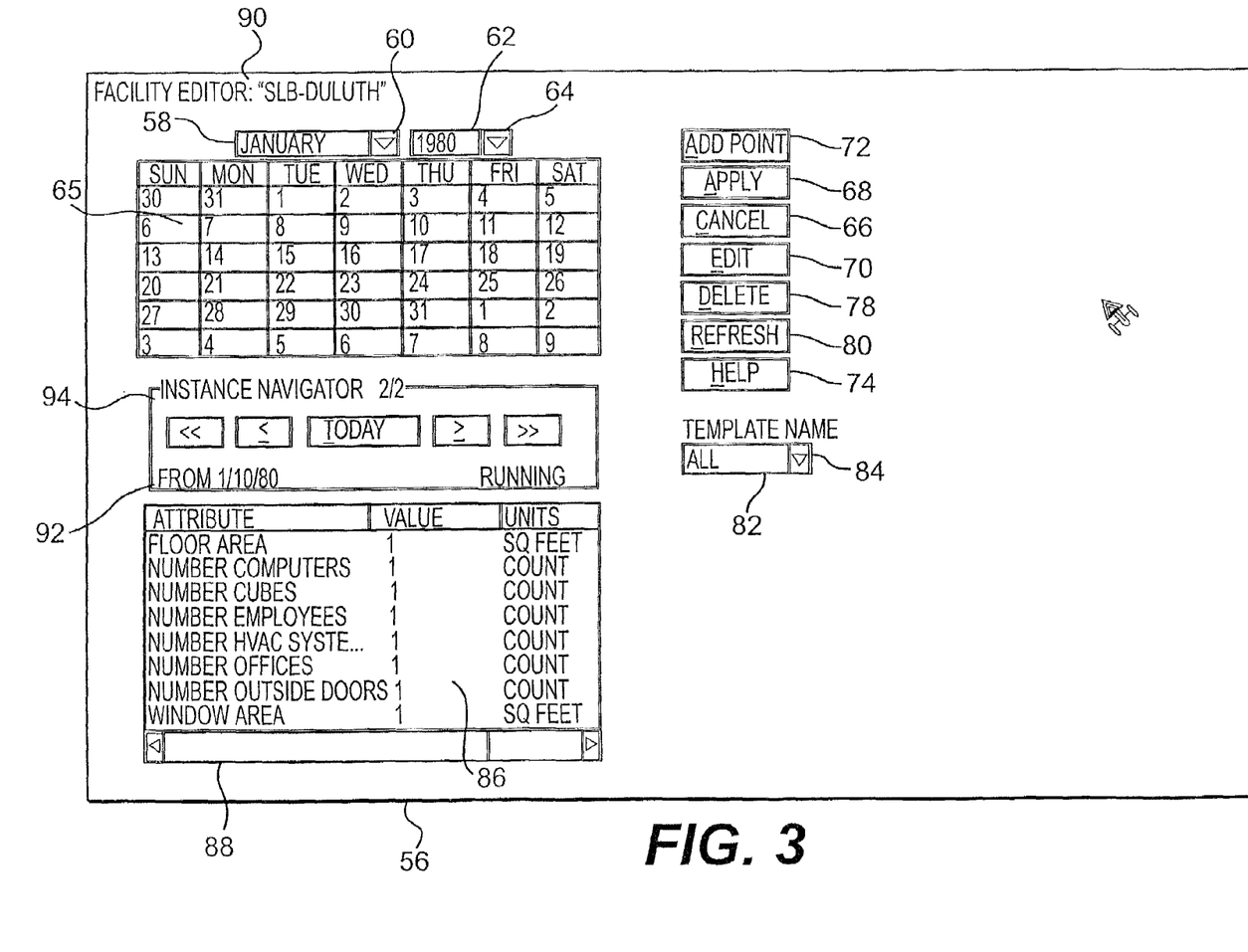
FIG. 3 depicts an exemplary display for a facility Instances (i.e., defined points in time) management screen in accordance with a present exemplary embodiment.

In accordance with the present invention, an exemplary facility editor 56, FIG. 3, may be used to define points in time (referenced herein as Instances) where new attribute values are entered into the system. When the user updates facility attribute values, thereby refining a facility model, such event marks the end of Instance X and the beginning of an Instance X+1. The facility model accuracy increases as time passes and as the number of Instances increases, which in turn, results in data that is increasingly representative of the real world.

To refine a facility model, the user selects the appropriate month 58, year 62, and day 65 representing the date of the change. A month is selected using drop-down arrow 60, a year is selected using drop-down arrow 64, and a day is selected by pressing the appropriate day button 65. Next, the template name that contains the attribute(s) to be changed should appear in template name window 82. This template can be chosen using the drop-down menu accessed by down-arrow 84. The instance that contains the attribute value(s) to be changed must now be selected using the Instance navigator keys 94.

It should be noted that the attributes associated with a given Instance will be shown in attribute window 86. To edit attribute values, the user presses the "Edit" button 70. Once all modifications have been made, the user would preferably press an "Apply" button 68 to record (i.e., incorporate) such changes. The user presses the "Cancel" button 66 to abandon changes. The user may remove an instance by pressing "Delete" button 78. A designated "Refresh" button 80 is used to refresh, or update, the present screen so that it displays current information.

Once a user has generated the required facility modeling information, various facility modeling processes, steps or functions (e.g., data normalization, data aggregation, facility benchmarking, report generation) may be activated (operational). In accordance with certain present embodiments, such functions may be activated when one of these events occurs: (1) a user activates such functions, (2) a user updates a facility model, or (3) a predetermined period of time elapses.

Figure 4:
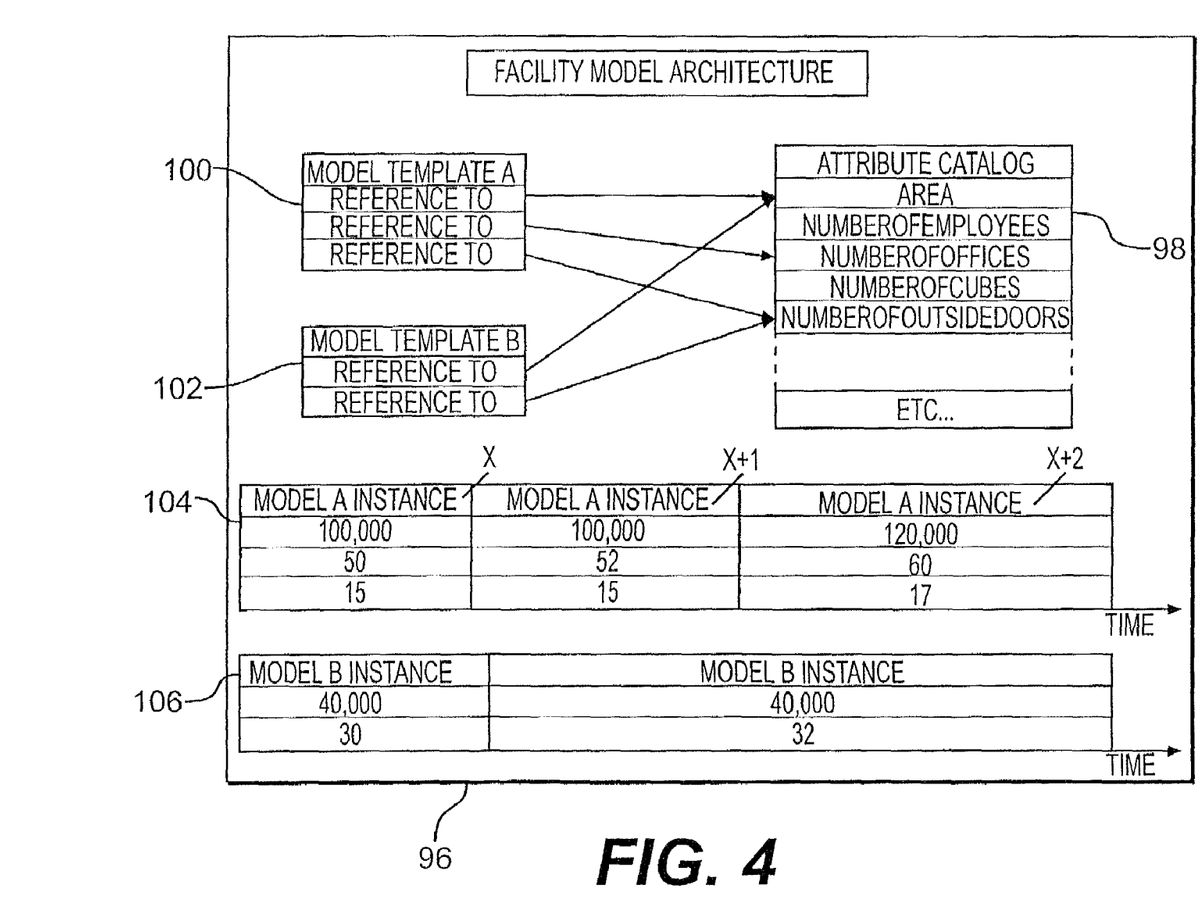
FIG. 4 depicts an exemplary facility model architecture sample in accordance with a present exemplary embodiment.

To help visualize and understand a Facility Model in accordance with the subject invention, FIG. 4 represents a sample or exemplary Facility Model Architecture 96. Sample Facility Model Architecture 96 shows a global attribute catalog 98 which is used to create two model templates: (1) Model Template A 100, and (2) Model Template B 102. In this example, Model Template A has three attributes while Model Template B has only two attributes. Three Model A instances 104 and two Model B instances 106 are represented.

For Model A Instance X, shown in FIG. 4, the facility area is 100,000 square feet, the number of employees is 50, and the number of outside doors is 15. For Model A Instance X+1, the facility area is still 100,000 square feet, but the number of employees has increased to 52, while the number of outside doors is still 15. Please note that updating the number of employees in this example marks the ending of Instance X and the beginning of Instance X+1.

When a facility Instance ends, as described above, the data normalization, aggregation, and benchmarking processes, steps or functions in accordance with the subject invention may be activated by a user as desired. For example, when a user is only interested in normalized data for one facility, the normalization process may be activated next. If, however, a user is interested in normalized data for a group of facilities, the aggregation process may be next activated in accordance with exemplary embodiments of the subject invention.

Whenever the normalization process is activated, it entails the process, in this example, of dividing a load profile channel, such as kiloWatt-hours (kWh), by a facility attribute, such as number (#) of employees, to obtain a new data set such as "kWh/employee". With reference to Model A Instance X (104), shown in FIG. 4, described above, assume that the resource utilization data of interest is the amount of electricity consumed during Instance X and that such value (in this example) is 500 kWh. Noting from FIG. 4 that the number of employees for Instance X is fifty, the subject exemplary normalization process would divide 500 kWh by 50 employees to give the normalized data of 10 kWh/employee.

Now consider as an example Model A Instance X+1 (FIG. 4). Noting that the number of employees has changed to fifty-two, and again assuming that (for such Instance X+1) the electricity consumed is 500 kWh, the normalized data for Instance X+1 is (as rounded) 9.6 kWh/employee (i.e., 500/52). Such normalized data for example could show the facility manager that adding two employees has not increased electrical energy cost for the facility. In fact, the electrical energy cost per employee is shown to have decreased slightly (based on the totally hypothetical, exemplary data indicated).

Figure 5:
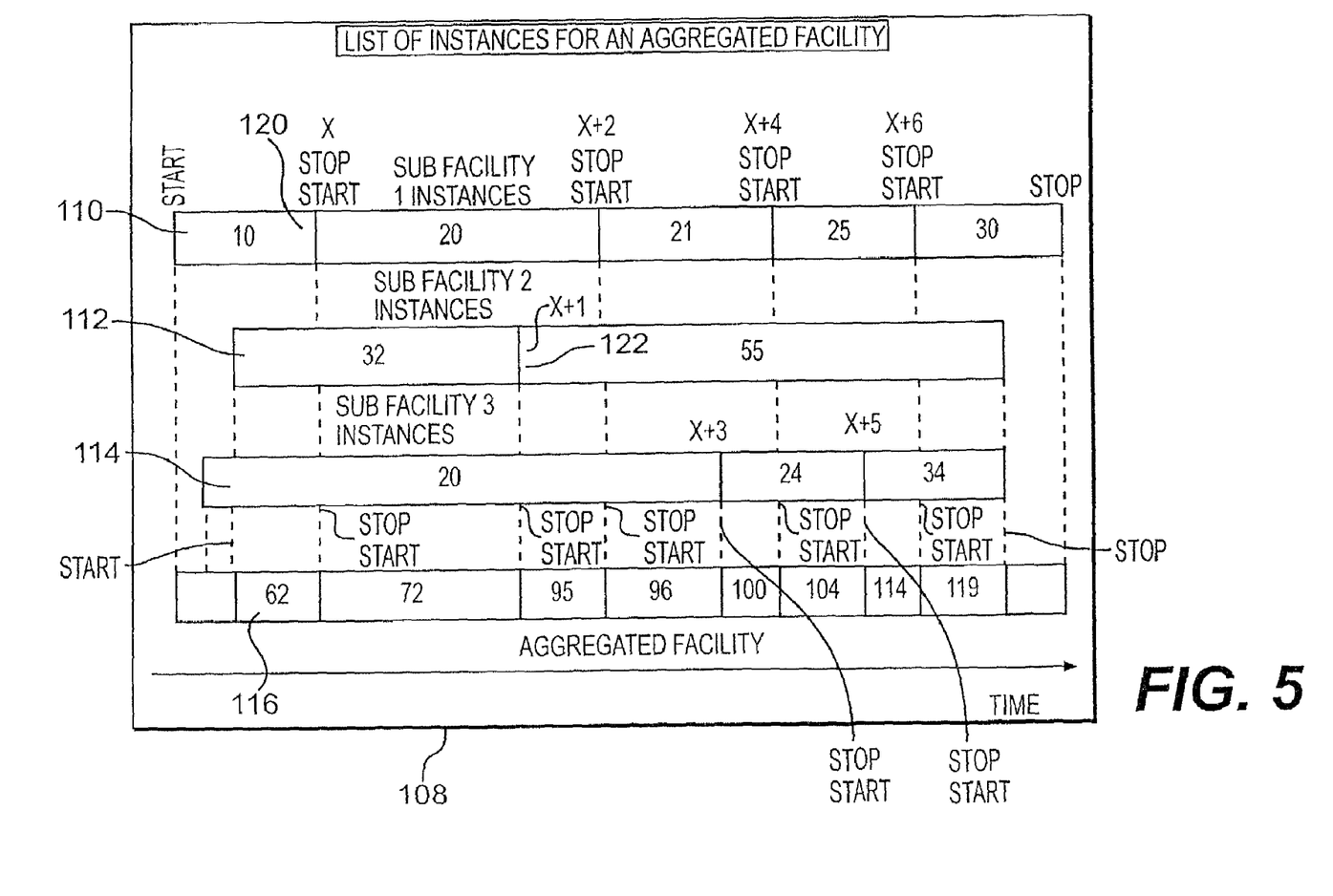
FIG. 5 an exemplary list of sample so-called Instances for an aggregated facility.

To generate aggregate normalized resource utilization data in accordance with the subject invention, an aggregation process is involved. Aggregate normalized resource utilization data is required when a user desires normalized data for a group of facilities. For example, with reference to present exemplary FIG. 5, "List of Instances for an Aggregated Facility" 108, three facilities are being compared. For this example, assume that the attribute being tracked is the number of employees. There are three so-called "Sub Facilities" in this example: Sub Facility 1, Sub Facility 2, and Sub Facility 3. Five instances 110 are shown for Sub Facility 1, two instances 112 for Sub Facility 2, and three instances 114 for Sub Facility 3. In FIG. 5, the first Instance, X, 120, is defined as the first time a sub facility model is updated to reflect changes in a facility attribute. The second Instance, X+1, 122, begins at the moment Instance X ends. Stated another way, the end of Instance X is the beginning of Instance X+1 and the end of X+1 is marked by the beginning of Instance X+2, and so forth for n subsequent Instances, X+n.

Once an Instance is defined, an aggregation process, step or feature in accordance with this invention can sum the attribute values of interest for all sub facilities. For Instance X (FIG. 5), such aggregation process in this example would add ten, thirty-two, and twenty for a total 116 of sixty-two employees. The next step in such preferred aggregation process would be to sum the facility resource utilization data of interest—kWh in this example. Assuming that the energy consumption during Instance X (FIG. 5) is as follows: (1) Sub Facility 1, 500 kWh, (2) Sub Facility 2, 875 kWh, and (3) Sub Facility 3, 600 kWh, the aggregation process would add the energy consumption data for such three sub facilities to determine a total of 1,975 kWh (not shown). The normalization step or function would preferably then be activated, so as to divide the aggregate resource utilization data by the aggregate facility attribute data, and return an aggregate normalized value (rounded) of 31.85 (1,975/62) kWh/employee.

Figure 6:
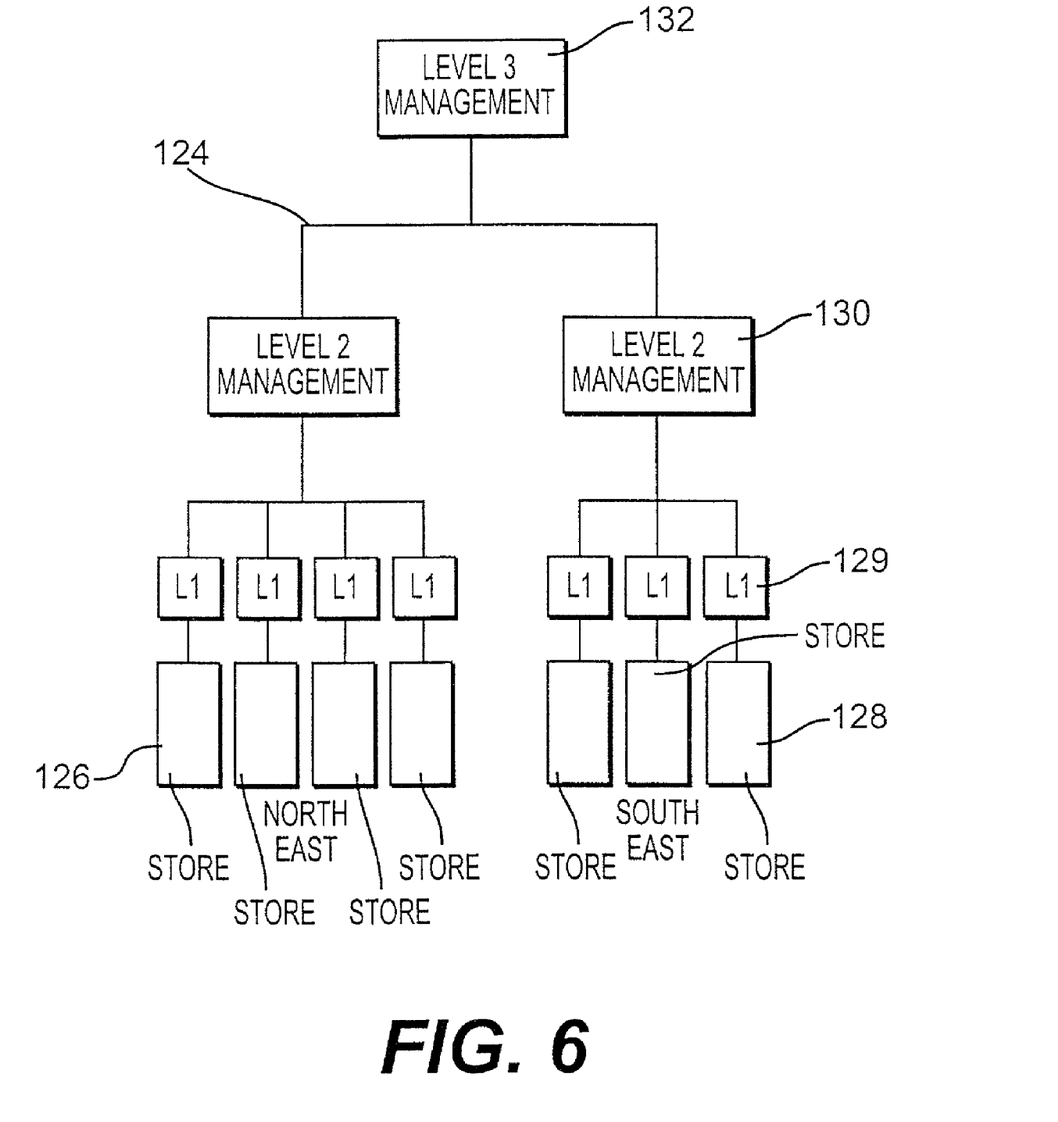
FIG. 6 diagrammatically depicts an exemplary embodiment of a sample organization with which certain embodiments of the present invention may be operative.

FIG. 6 represents a sample (or exemplary) organization 124 showing seven facilities owned by one user. Four exemplary facilities are located in an indicated territory, such as the Northeast 126 of the United States while three are located in the Southeast 128. Each exemplary facility (such as a store) has a Level-1 manager 129 while each group of stores, (Northeast, Southeast), share a respective Level-2 manager 130. Each of such Level-2 (or group) managers report to a Level-3 manager 132. While a Level-1 manager may only be interested in the normalized data for his or her facility, the Level-3 manager may wish to review the normalized data for all seven facilities individually, the aggregate normalized data for the four Northeast facilities, the aggregate normalized data for the three Southeast facilities, and/or the aggregate normalized data for all seven facilities, or some other statistical analysis.

Once the normalized or aggregate normalized resource utilization data has been created, a benchmarking process, step or feature in accordance with the present invention may be selectively activated. Such benchmarking, for example, may compare normalized data for two or more facilities, as specified by a user, and rank (i.e., benchmark) each facility based on said comparisons.

Importantly, as Level-1 managers (see FIG. 6) update the facility models for their respective facilities, Instances are created (as described above), new normalized facility resource utilization data may be calculated, and new benchmarking data may be generated at all management levels. Consequently, the present invention gives facility managers, whether responsible for one facility or numerous facilities, instantaneous facility resource utilization data and a powerful tool for monitoring and thus potentially controlling/reducing resource utilization.

In further present exemplary embodiments, a report generation process or feature may be selectively activated. Such report generation step or function may be used to present normalized data, aggregate normalized data, benchmarking results, and/or facilities models, all per user defined formats.

While flow charts per se have not been illustrated, the discussion above with reference to specific and general examples has been provided in such manner as to enable those of ordinary skill in the art to understand and use the invention. Specifically, exemplary methodologies and apparatuses/devices in accordance with the present invention may be practiced, such as with computer hardware and software installations. In such instances, those of ordinary skill in the art will readily ascertain the parameters of such particular embodiments based on the complete description within the subject application.

In addition, the present invention as described herein is not intended as being limited simply by virtue of specific exemplary language. For example, different "button" names may be utilized, without substantive impact on the invention disclosure herewith. For example, "Apply" could instead be relabeled as "Enter" or some other practical and/or understood convention. All such aspects of the present invention may be varied by those of ordinary skill in the art during the course of implementing specific embodiments of this invention, without departing from the spirit and scope thereof.

While the invention has been described in detail with respect to specific embodiments thereof, it will be appreciated that those skilled in the art, upon attaining an understanding of the foregoing may readily conceive of alterations to, variations of and equivalents to these embodiments. Accordingly, the scope of the present invention should be assessed as that of the appended claims and any equivalents thereto.

What is claimed is:

1. A method for modeling the performance of a facility, in relation to resource utilization of such facility, comprising the steps of:
    creating an attributes catalog wherein said attributes catalog comprises selected of user-defined attributes and system-defined attributes;
    reclassifying, by a system level process not accessible to a user, a user-defined attribute as a system-defined attribute whenever a predetermined percentage of users have added such user-defined attribute to the attributes catalog;
    assigning attributes to a template selected of user-defined or system-defined templates:
    assigning a predefined template to a facility to be modeled, said predefined template including default facility attribute data;
    obtaining resource utilization data for such facility;
    wherein selected of said facility attribute data and said resource utilization data is defined relative to instances, said instances established by points in time when such data is either created or updated, whereby defining said data relative to instances establishes how such data changes over time;
    normalizing such resource utilization data for selected of said instances based on said predefined template; and
    providing the normalized resource utilization data in the form of a report.

2. The method for modeling the performance of a facility, in relation to resource utilization of such facility as in claim 1, further comprising the step of using a template editor to assign said attributes to a facility template.

3. The method for modeling the performance of a facility, in relation to resource utilization of such facility as in claim 1, wherein said attributes catalog is maintained in a predetermined electronic storage.

4. The method for modeling the performance of a facility, in relation to resource utilization of such facility as in claim 1, wherein said normalizing step is activated by selected of the following events:
    (a) a user update of a facility model by modifying facility attribute values to reflect changes to said attribute values;
    (b) the demand of a user; and
    (c) the elapse of a predetermined period of time.

5. The method for modeling the performance of a facility, in relation to resource utilization of such facility as in claim 1, further comprising the step of estimating facility attribute data and facility resource utilization data for any period of time in the past.

6. The method for modeling the performance of a facility, in relation to resource utilization of such facility as in claim 1, further comprising the step of obtaining said resource utilization data and facility attribute data for two or more facilities.

7. The method for modeling the performance of a facility, in relation to resource utilization of such facility as in claim 6, further comprising the step of aggregating said resource utilization data and said facility attribute data, said data selected according to user defined criteria for a user defined group of facilities.

8. The method for modeling the performance of a facility, in relation to resource utilization of such facility as in claim 6, wherein said facility attribute data and resource utilization data include the aggregate sum of said data for two or more facilities.

9. The method for modeling the performance of a facility, in relation to resource utilization of such facility as in claim 1, further comprising the step of comparing said normalized resource utilization data for a user defined group of facilities.

10. The method for modeling the performance of a facility, in relation to resource utilization of such facility as in claim 9, further comprising the step of benchmarking said facilities based on said comparing step.

11. The method for modeling the performance of a facility, in relation to resource utilization of such facility as in claim 1, further comprising the step of presenting said data in the form of one of historical reports and real-time reports.

12. The method for modeling the performance of a facility, in relation to resource utilization of such facility as in claim 1, wherein said resource utilization data is selected from the resources of energy, water, natural gas and oil.

13. The method for modeling the performance of a facility, in relation to resource utilization of such facility as in claim 1, wherein said modeling method and said resource utilization data are provided to a customer via intercommunicating electronic media.

14. A method for creating dynamic facility models, in relation to resource utilization of such facilities, and comparing resource utilization efficiency of such facilities, comprising the steps of:
creating an attributes catalog wherein said attributes catalog comprises selected of user-defined attributes and system-defined attributes;
reclassifying, by a system level process not accessible to a user, a user-defined attribute as a system-defined attribute whenever a predetermined percentage of users have added such user-defined attribute to the attributes catalog;
assigning attributes to a template selected of user-defined or system-defined templates;
assigning selected of said templates to a facility to be modeled;
obtaining resource utilization data for such facility;
normalizing such resource utilization data based on said predefined template, said normalizing step performed for different points in time when selected of said user-defined attributes and system-defined attributes are created or changed;
comparing selected of said resource utilization data so as to benchmark each facility based on said comparing;
comparing resource utilization efficiency of such facilities; and
providing the normalized resource utilization data in the form of a report.

15. A method for creating dynamic facility models, in relation to resource utilization of such facilities, and comparing resource utilization efficiency of such facilities as in claim 14, further comprising the step of using a template editor to assign selected of said attributes to a facility template.

16. A method for creating dynamic facility models, in relation to resource utilization of such facilities, and comparing resource utilization efficiency of such facilities as in claim 15, further comprising the step of estimating facility attribute data and facility resource utilization data for any period of time in the past.

17. A method for creating dynamic facility models, in relation to resource utilization of such facilities, and comparing resource utilization efficiency of such facilities as in claim 15, further comprising the step of aggregating said resource utilization data and facility attribute data, said data selected according to user defined criteria for a user defined group of facilities.

18. The method for modeling the performance of a facility, in relation to resource utilization of such facility as in claim 14, wherein said normalizing step is activated by selected of the following events:
(a) a user update of a facility model by modifying facility attribute values to reflect changes to said attribute values;
(b) the demand of a user; and
(c) the elapse of a predetermined period of time.

19. A method for creating dynamic facility models, in relation to resource utilization of such facilities, and comparing resource utilization efficiency of such facilities as in claim 14, further comprising the step of using a facility editor to assign selected of said templates to a facility.

20. A method for creating dynamic facility models, in relation to resource utilization of such facilities, and comparing resource utilization efficiency of such facilities as in claim 14, further comprising the step of obtaining resource utilization data and for obtaining facility attribute data for two or more facilities.

21. A method for creating dynamic facility models, in relation to resource utilization of such facilities, and comparing resource utilization efficiency of such facilities as in claim 20, wherein said facility attribute data and resource utilization data include the aggregated sum of said data from two or more facilities.

22. A method for creating dynamic facility models, in relation to resource utilization of such facilities, and comparing resource utilization efficiency of such facilities as in claim 14, comprising the step of presenting said data in the form of one of historical reports and real-time reports.

23. A method for creating dynamic facility models, in relation to resource utilization of such facilities, and comparing resource utilization efficiency of such facilities as in claim 14, wherein said attributes catalog is maintained in predetermined electronic storage.

24. A method for creating dynamic facility models, in relation to resource utilization of such facilities, and comparing resource utilization efficiency of such facilities as in claim 14, wherein said resource utilization data is selected from resources of energy, water, natural gas and oil.

25. A method for creating dynamic facility models, in relation to resource utilization of such facilities, and comparing resource utilization efficiency of such facilities as in claim 14, wherein said modeling method and said resource utilization data are provided to a customer via intercommunicating electronic media.

26. A method for creating dynamic facility models, in relation to resource utilization, of such facilities, comparing resource utilization efficiency of such facilities, and generating reports in a user defined format, comprising the steps of:
  creating an attributes catalog wherein said attributes catalog comprises selected of user-defined attributes and system-defined attributes;
  reclassifying, by a system level process not accessible to a user, a user-defined attribute as a system-defined attribute whenever a predetermined percentage of users have added such user-defined attribute to the attributes catalog;
  using a template editor to assign attributes to a template selected of user-defined or system-defined templates;
  using a facility editor to define instances where selected of said user-defined attributes and system-defined attributes are created or updated and to assign selected of said templates to a facility to be modeled;
  obtaining resource utilization data for such facility;
  wherein selected of said facility attribute data and said resource utilization data is defined relative to instances, said instances established by points in time when such data is either created or updated, whereby defining said data relative to instances establishes how such data chanaes over time;
  normalizing such resource utilization data for selected of said instances based on said predefined template;
  comparing selected of said resource utilization data so as to benchmark each facility based on said comparing;
  generating one of historical and real-time reports, the data contained in such reports selected from facility modeling data, facility resource utilization data, and facility benchmarking data.

27. A method for creating dynamic facility models, in relation to resource utilization of such facilities, comparing resource utilization efficiency of such facilities, and generating reports in a user defined format as in claim 26, further comprising the step of estimating facility attribute data and facility resource utilization data for any period of time in the past.

28. A method for creating dynamic facility models, in relation to resource utilization of such facilities, comparing resource utilization efficiency of such facilities, and generating reports in a user defined format as in claim 26, further comprising the step of obtaining said resource utilization data and facility attribute data for two or more facilities.

29. A method for creating dynamic facility models, in relation to resource utilization of such facilities, comparing resource utilization efficiency of such facilities, and generating reports in a user defined format as in claim 28, further comprising the step of aggregating said resource utilization data and facility attribute data, said data selected according to user defined criteria for a user defined group of facilities.

30. A method for creating dynamic facility models, in relation to resource utilization of such facilities, comparing resource utilization efficiency of such facilities, and generating reports in a user defined format as in claim 28, wherein said resource utilization data and said facility attribute data includes the aggregated sum of said data from two or more facilities.

31. A method for creating dynamic facility models, in relation to resource utilization of such facilities, comparing resource utilization efficiency of such facilities, and generating reports in a user defined format as in claim 26, wherein said attributes catalog is maintained in predetermined electronic storage.

32. A method for creating dynamic facility models, in relation to resource utilization of such facilities, comparing resource utilization efficiency of such facilities, and generating reports in a user defined format as in claim 26, wherein said resource utilization data is selected from resources of energy, water, natural gas and oil.

33. A method for creating dynamic facility models, in relation to resource utilization of such facilities, comparing resource utilization efficiency of such facilities, and generating reports in a user defined format as in claim 26, wherein said modeling method and said resource utilization data are provided to a customer via intercommunicating electronic media.

34. Apparatus for creating dynamic facility models, in relation to resource utilization of such facilities, comprising:
  means for creating an attributes cataloa wherein said attributes catalog comprises selected of user-defined attributes and system-defined attributes;
  a template editor for assigning attributes to a template selected of user-defined or system-defined templates;
  means for reclassifying a user-defined attribute as a system-defined attribute whenever a predetermined percentage of users have added such user-defined attribute to said attributes catalog wherein such reclassifying means is not accessible to a user;
  a facility editor for assigning a predefined template to a facility to be modeled, said predefined template including default facility attribute data defined for selected instances that are established by points in time when selected of said attribute data is created or changed;
  data retrieval means for obtaining resource utilization data for such facility;
  data normalization means for normalizing said resource utilization data based on said predefined template;
  means for comparing selected of the normalized resource utilization data so as to benchmark each facility based on said comparing; and
  providing the normalized resource utilization data in the form of a report.

35. An apparatus for creating dynamic facility models, in relation to resource utilization of such facilities as in claim 34, further comprising an attributes catalog editor for performing functions selected of:
  (i) creating new facility attributes;
  (ii) adding new facility attributes to said attributes catalog; and
  (iii) deleting user-defined attributes from said attributes catalog.

36. An apparatus for creating dynamic facility models, in relation to resource utilization of such facilities as in claim 35, further comprising data storage means for storing said attributes catalog.

37. An apparatus for creating dynamic facility models, in relation to resource utilization of such facilities as in claim 34, further comprising a template editor for assigning said facility attributes, contained in said facility attributes catalog, to a facility template.

38. An apparatus for creating dynamic facility models, in relation to resource utilization of such facilities as in claim 37, further comprising means for estimating facility attribute data and facility resource utilization data, for any period of time in the past.

39. An apparatus for creating dynamic facility models, in relation to resource utilization of such facilities as in claim 34, wherein said data retrieval means is further operative for obtaining said resource utilization data and said facility attribute data for two or more facilities.

40. An apparatus for creating dynamic facility models, in relation to resource utilization of such facilities as in claim 39, further comprising means for aggregating said resource utilization data and facility attribute data.

41. An apparatus for creating dynamic facility models, in relation to resource utilization of such facilities as in claim 40, further comprising means for aggregating said facility attribute data and said resource utilization data, said data selected according to user defined criteria for a user defined group of facilities.

42. An apparatus for creating dynamic facility models, in relation to resource utilization of such facilities as in claim 34, further comprising means for comparing normalized resource utilization data for the purpose of ranking the resource utilization of each facility based on such comparing.

43. An apparatus for creating dynamic facility models, in relation to resource utilization of such facilities as in claim 34, further comprising means for generating one of historical and real-time reports of selected data.

44. An apparatus for creating dynamic facility models, in relation to resource utilization of such facilities as in claim 43, further comprising electronic media means for supplying customer access to selected of said:
  (i) predefined template;
  (ii) resource utilization data retrieval means;
  (iii) data normalization means;
  (iv) default facility attribute data; and
  (v) historical and real-time reports.

45. An apparatus for creating dynamic facility models, in relation to resource utilization of such facilities as in claim 34, wherein said resource utilization data is selected from the resources energy, water, natural gas and oil.

* * * * *

UNITED STATES PATENT AND TRADEMARK OFFICE
CERTIFICATE OF CORRECTION

PATENT NO. : 7,219,069 B2 Page 1 of 1
APPLICATION NO. : 09/849938
DATED : May 15, 2007
INVENTOR(S) : Christophe Fouquet It is certified that error appears in the above-identified patent and that said Letters Patent is hereby corrected as shown below:

In Column 14, line 16, please delete the word "cataloa" and replace with --catalog--.

Signed and Sealed this

Fourth Day of September, 2007

JON W. DUDAS
*Director of the United States Patent and Trademark Office*